United States Patent
Tysowski et al.

(10) Patent No.: US 7,478,118 B2
(45) Date of Patent: Jan. 13, 2009

(54) METHOD AND APPARATUS FOR SYNCHRONIZING OF DATABASES CONNECTED BY WIRELESS INTERFACE

(75) Inventors: Piotr K. Tysowski, Waterloo (CA); Michael T. Hardy, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 243 days.

(21) Appl. No.: 11/476,872

(22) Filed: Jun. 29, 2006

(65) Prior Publication Data

US 2008/0005200 A1 Jan. 3, 2008

(51) Int. Cl.
*G06F 12/00* (2006.01)
*G06F 17/30* (2006.01)

(52) U.S. Cl. .................................. 707/204; 707/203
(58) Field of Classification Search .................. 707/2, 707/4, 5, 10, 200, 203, 204; 717/100
See application file for complete search history.

(56) References Cited

U.S. PATENT DOCUMENTS

| | | | | |
|---|---|---|---|---|
| 5,684,984 A * | 11/1997 | Jones et al. | | 707/10 |
| 5,890,166 A * | 3/1999 | Eisenberg et al. | | 707/203 |
| 6,044,373 A * | 3/2000 | Gladney et al. | | 707/10 |
| 6,434,590 B1 * | 8/2002 | Blelloch et al. | | 718/102 |
| 6,591,266 B1 * | 7/2003 | Li et al. | | 707/10 |
| 6,601,076 B1 | 7/2003 | McCaw et al. | | |
| 7,353,223 B2 * | 4/2008 | Klein | | 707/4 |
| 2004/0196855 A1 | 10/2004 | Davies et al. | | |
| 2004/0199655 A1 | 10/2004 | Davies et al. | | |
| 2005/0038831 A1 * | 2/2005 | Souder et al. | | 707/201 |
| 2005/0147130 A1 | 7/2005 | Hurwitz et al. | | |
| 2005/0262470 A1 * | 11/2005 | Gavrilov | | 717/100 |

OTHER PUBLICATIONS

Qinyi Wu and Calton Pu (2006), DAG Synchronization Constraint Language for Business Processes, pp. 1-8.*
Franklin, Michael et al., "From Databases to dataspaces: a new abstraction for information management", ACM Sigmod Record, vol. 34. No. 4, Dec. 2005.
Anonymous, "Methods to Solve—Chapter 9 graphs", May 16, 2006, pp. 1-7.

* cited by examiner

*Primary Examiner*—Don Wong
*Assistant Examiner*—Merilyn P Nguyen
(74) *Attorney, Agent, or Firm*—Perry + Currier Inc

(57) ABSTRACT

A method for synchronizing databases at a portable electronic device with corresponding databases at a second electronic device, the method including determining which one of the databases at the portable electronic device is to be synchronized based on a directed acyclic graph representing database dependencies, and synchronizing the one of the databases at the portable electronic device with a corresponding one of the databases at the second electronic device.

12 Claims, 8 Drawing Sheets

METHOD AND APPARATUS FOR SYNCHRONIZING OF DATABASES CONNECTED BY WIRELESS INTERFACE

FIELD

The present application relates to synchronization of data at a portable electronic device with data embodied at a communication network.

BACKGROUND

Portable electronic devices such as wireless personal digital assistants (PDAs), smart telephones and laptop computers with wireless capabilities have gained widespread use for a variety of functions. Such devices are commonly used for communication purposes including transportation of data, and run on a wide variety of networks from data-only networks such as Mobitex and DataTAC to complex voice and data networks such as GSM/GPRS, CDMA, EDGE, UMTS and W-CDMA networks.

These portable electronic devices commonly include databases for storing data that is selectably retrievable by a user of a device. The data forms a series of data records, each data record containing one or more fields. During operation of the device, the data is retrieved and displayed, or otherwise made available to the user. The data can be modified, added to or deleted by the user of the device.

Advances in data storage have accompanied advances in portable electronic devices to provide for back-up of data stored at the electronic device. By backing-up the device, data can be recovered in the event of data loss at the electronic device. Various electronic devices are backed-up by way of communication over a fixed (wire) connection between the electronic device and, for example, a computing station such as a desktop computer. Once the data is stored in a database at the computing station, the stored data can be modified, added to or deleted by a user at the computing station.

Other portable electronic devices provide for back-up of data stored thereon, to a computing station by way of a radio interface, using, for example, the networks listed above. Thus, data is sent over a radio communication channel of a radio communication system, thereby forming a communications link between the portable electronic device and a remote station (a station not linked by wire communication). Again, once the data is stored in a database at a computing station, the stored data can be modified, added to or deleted at the computing station. Thus, while data stored in the database of the portable electronic device is backed-up to a computing station, data is also transmitted from the computing station to the portable electronic device to synchronize the databases of the portable electronic device with the databases of the computing station. When a data record on a computing station does not exist on the portable electronic device, or when the content of the data record (the fields of the data record) of the computing station differs from the content of the data record of the portable electronic device, then the additional data record or differing data record is transferred to the portable electronic device. Similarly, when a data record on a portable electronic device does not exist on the computing station, or when the content of the data record of the portable electronic device differs from the content of the data record of the computing station, the additional data record or differing data record is transferred to the computing station. When a data record is deleted from the portable electronic device, a delete data record indication is sent from the portable electronic device to the computing station in order to delete the corresponding data record at the computing station. Similarly, when a data record is deleted from the computing station, a delete data record indication is sent from the computing station to the portable electronic device in order to delete the corresponding data record at the portable electronic device.

Data synchronization over a radio communication channel is clearly advantageous as data can be communicated remotely over large distances. During the synchronization process, for example to restore data on the portable electronic device, databases of the portable electronic device that are backed up at the computing station, are restored in a particular order to ensure that databases that have dependencies on other databases, are restored in a desired order. Thus, an Address Book database that includes a sorting order is restored prior to a main Address Book database that includes contacts so that the contacts are sorted as they are stored.

One approach to ensuring that databases are restored in a desired order is to assign each database a number between 1 and 10, for example. Such an approach suffers disadvantages, however, as there are no clearly defined dependencies between databases. Instead, databases are simply assigned one of a limited number of priority levels. When one database priority level is reassigned, other database priority levels that depend on the one database must also be reassigned. Clearly, the order and priority is difficult to keep track of when several databases are present.

BRIEF DESCRIPTION OF THE DRAWINGS

The method and apparatus for synchronizing databases connected by wireless interface will be better understood with reference to the following description and to the Figures, in which.

DETAILED DESCRIPTION OF EMBODIMENTS

Figure 1:
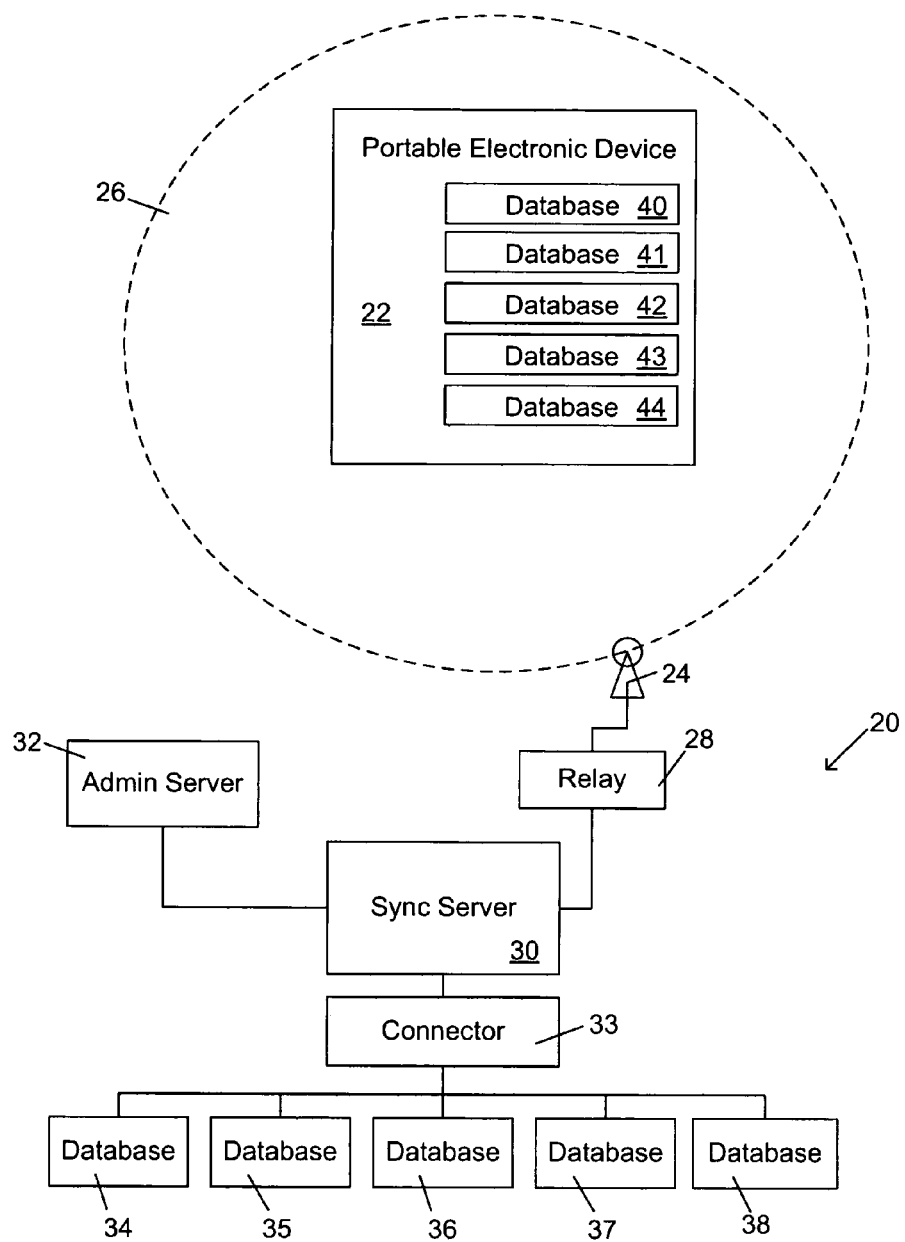
FIG. 1 is a functional block diagram of an exemplary radio communication system including a portable electronic device and a communication system having a synchronization server.

Reference is first made to FIG. 1 which shows a functional block diagram of a radio communication system indicated generally by the numeral 20 and a portable electronic device 22. The radio communication system 20 provides for communications with portable electronic devices including the exemplary portable electronic device 22, as shown. The portable electronic device 22 and the radio communication system 20 are operable to effect communications over a radio communications channel therebetween. Data originating at the portable electronic device 22 is communicated to the radio communication system 20 by way of the radio communications channel. Similarly, data originating at the communication system 20 is communicated from the radio communication system 20 to the portable electronic device 22 by way of the radio communications channel, thereby providing data to the portable electronic device 22.

For the purposes of illustration, the communication system 20 is functionally represented in FIG. 1 and a single base station 24 is shown. The base station 24 defines a coverage area, or cell 26 within which communications between the base station 24 and the portable electronic device 22 can be effectuated. It will be appreciated that the portable electronic device 22 is movable within the cell 26 and can be moved to coverage areas defined by other cells that are not illustrated in the present example. The communication system 20 includes a relay device 28 that is connected to the base station 24 and to a synchronization server 30. It will be understood that the functions provided by the relay device 28 and the synchronization server 30 can be embodied in the same device. The synchronization server 30 is connected to an administration server 32, as shown. The administration server 32 provides administrative services to the communications system 20 and, for instance, provides administrative control over the synchronization server 30.

The synchronization server 30 is also functionally coupled through a personal information management connector 33 to databases, of which, five exemplary database types including a database 34, a database 35, a database 36, a database 37 and a database 38, are shown. The personal information management connector 33 interfaces between the synchronization server 30 and the databases 34, 35, 36, 37, 38. It will be understood that the personal information management connector 33 is a functional component and can be provided by way of an application on the synchronization server 30. The databases of the present example are of a text format such as an extensible mark-up language (XML) format. The data maintained in the databases 34, 35, 36, 37, 38 includes a number of data records, each data record containing a plurality of fields that are populated with data.

The portable electronic device 22, of which only particular functional portions are shown in FIG. 1 for the purposes of the present description, includes a plurality of databases 40, 41, 42, 43, 44 that correspond to the databases 34, 35, 36, 37, 38, respectively, of the communication system 20. The databases 34, 35, 36, 37, 38 and the databases 40, 41, 42, 43, 44, can be selectably altered in an asymmetrical manner such that the databases 34, 35, 36, 37, 38 of the communication system 20 do not match the databases 40, 41, 42, 43, 44 of the portable electronic device 22. In other words, any or all of the databases 34, 35, 36, 37, 38, 40, 41, 42, 43, 44 can be altered by adding records, deleting records and modifying fields of the records by adding, deleting or modifying the data populating those fields.

Figure 2:
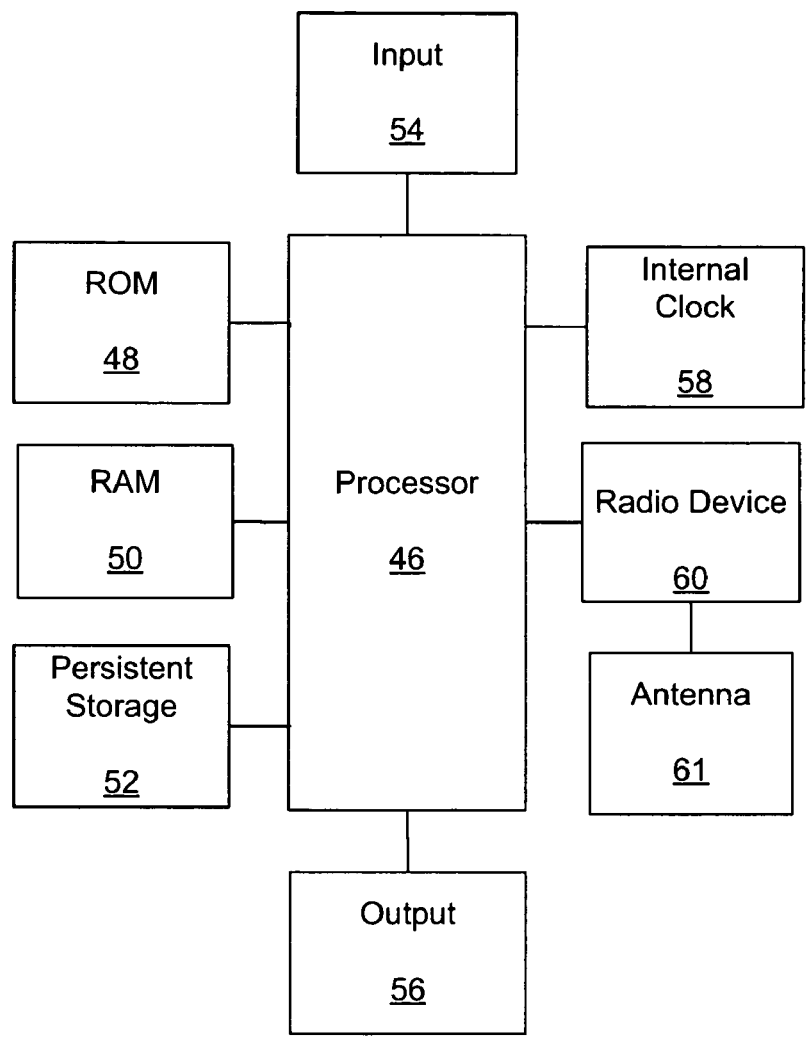
FIG. 2 is a block diagram of certain internal components within the portable electronic device of FIG. 1.

Reference is now made to FIG. 2 which shows a block diagram of certain internal components within the portable electronic device 22. The portable electronic device 22 is based on a microcomputer that includes a processor 46 connected to a read-only memory (ROM) 48 that contains a plurality of applications executable by the processor 46 to enable the portable electronic device 22 to perform certain functions including synchronization with the communication system 20. For example, a synchronization agent is provided for interfacing between the synchronization server 30 and the portable electronic device 22. The processor 46 is also connected to a random-access memory unit (RAM) 50 and a persistent storage device 52 which are responsible for various non-volatile storage functions of the portable electronic device 22 and in which the databases 40, 41, 42, 43, 44 are maintained. Each of the databases 40, 41, 42, 43 and 44 to be synchronized are registered with the synchronization agent upon start up of the portable electronic device 22. The processor 46 receives input from input devices 54 such as a keyboard. The processor 46 outputs to output devices 56 such as an LCD display. The processor 46 is also connected to an internal clock 58 and to a radio device 60 which in turn is connected to an antenna 61. Together the radio device 60 and the antenna 61 are used to connect to the radio communication system 20 over a radio communications channel. Thus, the portable electronic device 22 is operable to receive and transmit communication signals containing data that is communicated to and from the communication system 20 via the radio device 60 and the antenna 61.

It will be understood that the functions described herein can be carried out in any suitable manner. In the present example, the functions are carried out by algorithms executable by the processor 46 in a synchronization application. For example, the processor 46 of the portable electronic device 22 is operable to perform hash functions by retrieving the data from one or more of the databases 40, 41, 42, 43, 44 of the persistent storage device 52 and generating a hash, thereby placing the accessed data in short-digest form. Hash functions performed by the processor 46 include, for example, computation of check sums as well as other hash function computations. The processor 46 is further operable to provide the generated hash to the radio device 60 for transmission from the portable electronic device 22 to the radio communication system 20 over the radio communications channel. Hash generation is triggered either by an input from the input device 54 or by a signal received from the communication system 20. The processor 46 is further operable to generate an initiate session command and to transmit the command over the radio communications channel along with the hash.

The microcomputer of the portable electronic device 22 is operable to receive communications from the communication system 20. For example, the microcomputer is operable to receive a request for additional hash information and in response, to provide additional hash information. The microcomputer is further operable to receive a request for data records which, in response to such a request, the data records from one or more of the databases 40, 41, 42, 43, 44 are transmitted to the communication system 20. Further still, the microcomputer is operable to receive data transmitted from the communication system 20 and to write the data by adding the data to one or more of the databases 40, 41, 42, 43, 44 or overwriting data on one or more of the databases 40, 41, 42, 43, 44 maintained on the persistent storage device 52.

Figure 3:
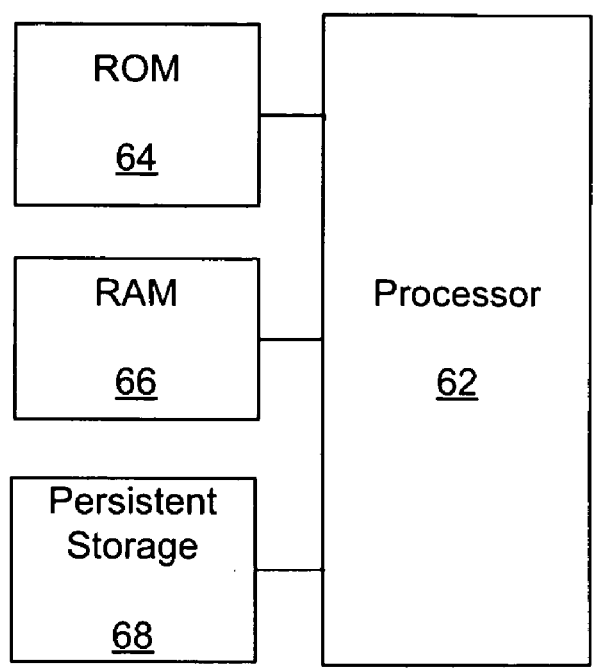
FIG. 3 is a block diagram of certain internal components within the synchronization server of FIG. 1.

Reference is now made to FIG. 3 which shows a block diagram of certain internal components within the synchronization server 30. Similar to the portable electronic device 22, the synchronization server 30 includes a processor 62 connected to a read only memory (ROM) 64 that includes applications executable by the processor 62 and enables the synchronization server 30 to perform certain functions including synchronization with the portable electronic device 22. The processor 62 is also connected to a random access memory unit (RAM) 66 and a persistent storage device 68 which are responsible for various non-volatile storage functions of the synchronization server 30. The processor 62 is functionally connected to the databases 34, 35, 36, 37, 38 through the personal information management connector 33 and to the relay device 28, which in turn is connected to the base station 24 for connecting to the portable electronic device 22 over a radio communications channel. Thus, the synchronization server 30 is operable to receive and transmit communication signals containing data that is communicated to and from the portable electronic device 22 via the relay device 28 and the base station 24.

Again, it will be understood that the functions described herein can be carried out in any suitable manner. In the present example, the functions are carried out by algorithms executable by the processor 62. For example, the processor 62 of the synchronization server 30 is operable to receive communications generated by the portable electronic device relating to synchronization, including an initialize synchronization command and group hash values representing data from databases of the portable electronic device 22. The synchronization server 30 is further operable to request data records from the personal information management connector 33, to perform hash functions upon receipt of the data records from one or more of the databases 34, 35, 36, 37, 38 and to generate a locally generated hash, thereby placing the accessed data in short-digest form. The synchronization server 30 is further operable to compare the hash information from the hash received from the portable electronic device 22 to the hash information from the locally generated hash. The synchronization server 30 is also operable to request additional information from the portable electronic device 22, based on and in response to results of the comparison of the hash information from the hash generated by the portable electronic device 22 with the hash information from the locally generated hash. The request for additional information is provided to the relay 28 and, through the base station 24, is transmitted to the portable electronic device 22. The request for additional information can be a request for additional hash information or a request for data records, depending on the results of the comparison of the hash information from the hash generated by the portable electronic device 22 with the hash information from the locally generated hash. Further, the synchronization server 30 is operable to receive data transmitted from the portable electronic device 22 (through the base station 24 and relay device 28) and to write the data by adding the data through the personal information management connector 33, to one or more of the databases 34, 35, 36, 37, 38 or overwriting the data through the personal information management connector 33, on one or more of the databases 34, 35, 36, 37, 38. Further still, the synchronization server 30 stores synchronization history data in the persistent storage device 68, thereby maintaining a listing of changes made to the databases 34, 35, 36, 37, 38 connected through the personal information management connector 33 to the synchronization server 30 and to the databases 40, 41, 42, 43, 44 of the portable electronic device 22. The synchronization server 30 accesses the synchronization history data during synchronization operations to reduce the data communicated between the communication system 20 and the portable electronic device 22 in subsequent synchronizations by determining previously synchronized data.

Figure 4:
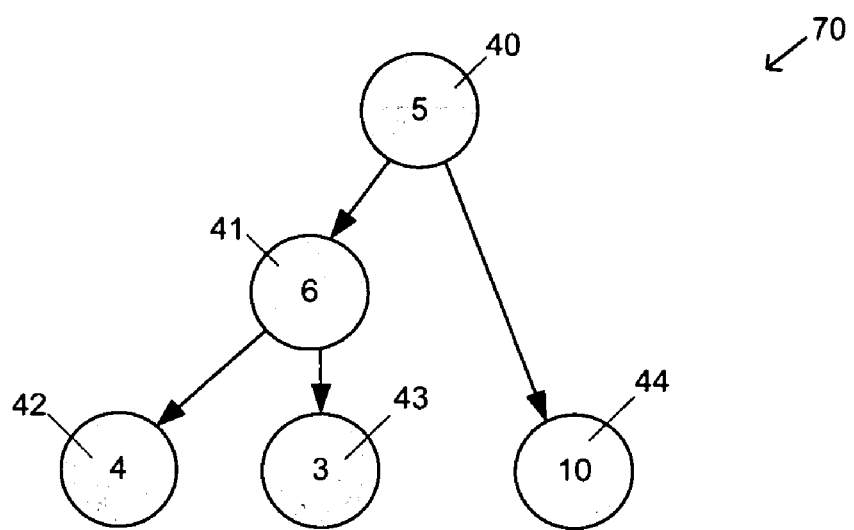
FIG. 4 is an exemplary directed acyclic graph used during synchronization of databases, according to one embodiment.

Referring to FIG. 4, an exemplary directed acyclic graph 70 is shown. The directed acyclic graph 70 of the present example includes 5 nodes representing respective databases 40, 41, 42, 43, 44 of the portable electronic device 22. Each node of the graph is associated with the respective database that the node represents by, for example the name of the database or some unique identifier. The nodes are connected by edges thereby representing dependency relationships between the databases 40, 41, 42, 43, 44. In the present directed acyclic graph 70, the database 40 clearly does not depend on any other database as the node representing database 40 is shown as a source (without incoming edges). The databases 41 and 44, on the other hand, depend from the database 40. Thus, database 40 is restored prior to databases 41 and 44. Databases 42 and 43 depend from database 41 and therefore databases 42 and 43 are restored after database 41. Each database includes an associated numerical weighting which, in the present example, represents the size of the database. In the exemplary directed acyclic graph, the associated numerical weighting is shown in the nodes representing the databases. It will be appreciated that these numerical weightings can be included in the graph or can be associated with the databases in any other suitable manner. For example, the numerical weightings can be associated with the respective databases in, for example, a lookup table.

The directed acyclic graph 70 is stored in memory at the portable electronic device 22 and is initialized on start up of the portable electronic device 22, when the databases 40, 41, 42, 43, 44 for synchronization are registered with the synchronization agent. A new node is added to the directed acyclic graph whenever a new database is enabled for synchronization. The addition of a new database includes the addition of defined dependencies (identification of databases from which the new database depends and identification of databases that depend from the new database). Cycles in the graph are not permitted and the database is not initialized if a cycle is detected. If a database is deleted, the associated node and any edges incident to that node are removed from the directed acyclic graph.

According to one embodiment, there is provided a method for synchronizing the databases 40, 41, 42, 43, 44 at the portable electronic device 22 with corresponding databases 34, 35, 36, 37, 38 at a second electronic device. The method includes determining which one of the databases 40, 41, 42, 43, 44 at the portable electronic device 22 is to be synchronized based on the directed acyclic graph representing database dependencies. The one of the databases 40, 41, 42, 43, 44 is synchronized with a corresponding one of the databases 34, 35, 36, 37, 38 at the second electronic device.

Figure 5A:
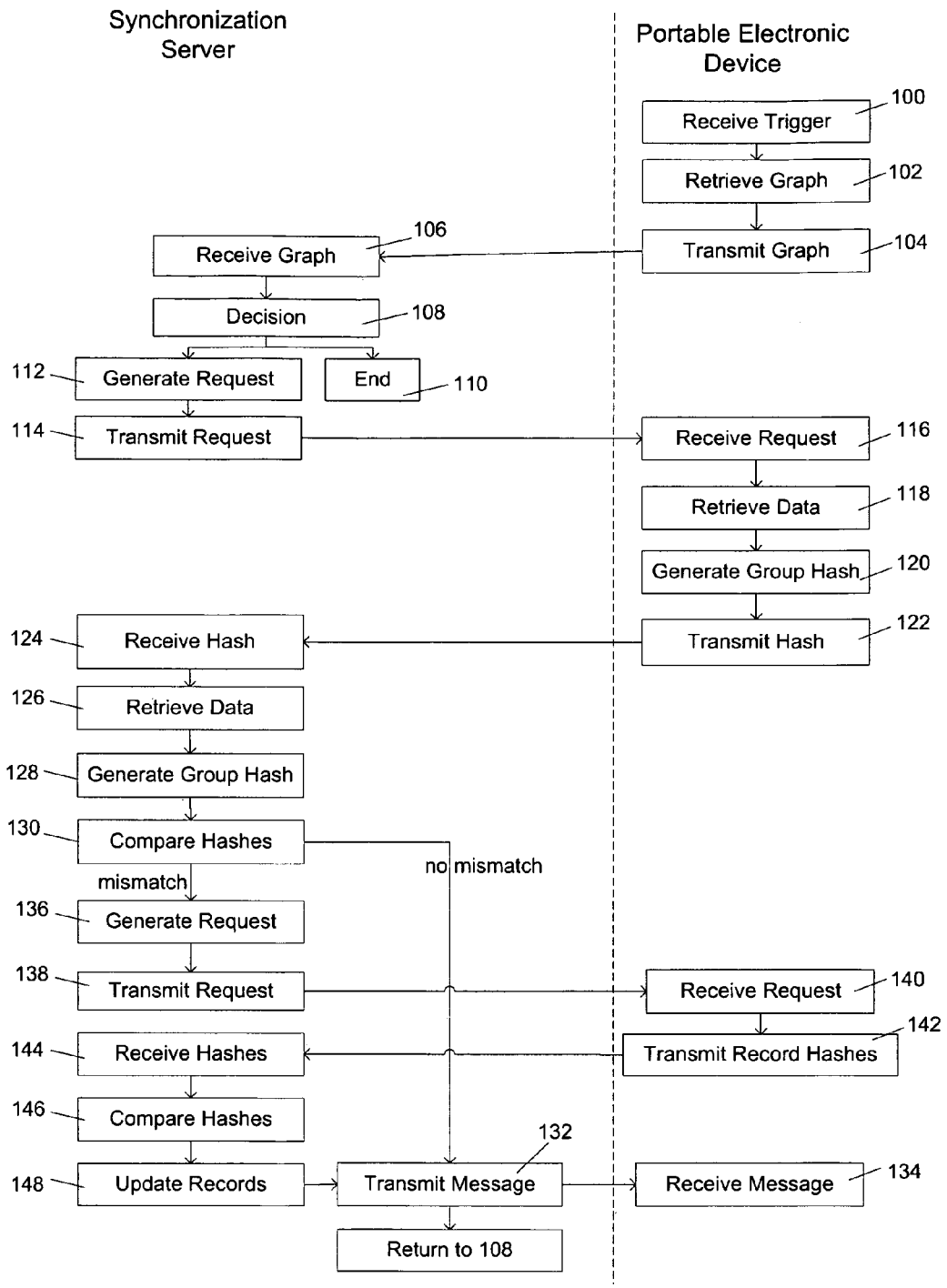
FIGS. 5A and 5B, are sequence diagrams illustrating functions carried out at both the portable electronic device and the communication system of FIG. 1 during synchronization of databases according to one embodiment.

Reference is now made to FIG. 5A, which shows a sequence diagram illustrating functions carried out at both the portable electronic device 22 and the communication system 20 during synchronization of databases connected by wireless interface, in accordance with an embodiment of the present application. Coding of software for carrying out such steps is well within the scope of a person of ordinary skill in the art. First, the portable electronic device 22 receives a synchronization trigger at 100, from, for example, a user input on the input device 54, triggering a synchronization process for the databases 40, 41, 42, 43, 44. In response to receipt of the synchronization trigger, the directed acyclic graph 70 is retrieved from memory at step 102 and is transmitted to the synchronization server 30 via the radio device 60 and antenna 61 at step 104.

Figure 5B:
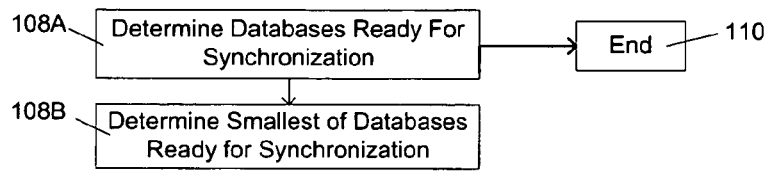

The communication system 20 receives the directed acyclic graph 70 at step 106 by receipt at the base station 24. The base station 24 forwards the directed acyclic graph to the synchronization server 30. As indicated above, the directed acyclic graph 70 identifies the databases for synchronization and provides clear dependency relationships between the databases for synchronization, to the synchronization server 30. The synchronization server 30 then makes a decision on what, if any, database to synchronize next based on the directed acyclic graph 70 at step 108. Referring to FIG. 5B, the decision of what, if any, database to synchronize first (for databases that have not already been synchronized) is based on the database dependencies and then based on the size of the database. At step 108A, the synchronization server 30 determines which of the databases represented by the directed acyclic graph, are ready to be synchronized. A particular database is ready for synchronizing when that database has not yet been synchronized and when all databases from which that particular database depends (if any), have been synchronized. Conversely, when any database from which a particular database depends, has not been synchronized, that particular database is not ready for synchronizing. After determining which databases represented by the directed acyclic graph are ready to be synchronized, the synchronization server 30 determines which of these databases is to be synchronized based on the size of the database. Thus, in the present embodiment, the smallest database is synchronized first in order to synchronize the highest number of databases in the shortest period of time. Referring again to FIG. 4 for exemplary purposes, none of the databases has been synchronized yet. Thus, the only database for which all databases from which it depends (if any), have been synchronized, is the database 40. Thus, the synchronization server determines that the database 40 is to be synchronized. The synchronization server 30 then generates a request for the group hash of the database 40 at step 112. The request for the group hash of the database 40 is then transmitted to the portable electronic device 22 at step 114.

The request for the group hash of the database 40 is received at the portable electronic device 22 at step 116 and, in response, data is retrieved from the database 40 at step 118. The processor 46 first generates a record hash for each data record of the database 40 and then generates a group hash for the database 40, based on the individual record hashes at step 120. Thus, the group hash is representative of the data records of the database 40. After generation, the group hash is transmitted to the communication system 20 along with an initialize command, over a radio communication channel at step 122. The initialize command initiates the synchronization process at the synchronization server 30, identifies the databases for synchronization and provides synchronization session state information including a session state identifier. The portable electronic device 22 then awaits a response from the communication system 20.

The communication system 20 receives the initialize command along with the group hash at step 124 by receipt at the base station 24. The base station 24 forwards the initialize command and the group hash to the synchronization server 30. As indicated above, the initialize command identifies the database for synchronization and provides synchronization session state information including the session state identifier. A synchronization session is thereby started with the portable electronic device 22. In response to receipt of the initialize command, the synchronization server 30 retrieves all data records for the database 34 on the communication system 20 side that correspond with the database 40 of the portable electronic device 22 at step 126. The data records of the database 34 are retrieved at step 126 by generating a request for all data records of the database 34 and sending the request to the personal information management connector 33 to retrieve the records of the database 34. The personal information management connector 33 then fetches all records from the database 34 in accordance with the request and forwards the records to the synchronization server 30. The synchronization server 30 first generates a record hash for each data record of the database 34. The record hashes are referred to herein as the locally generated record hashes. From the locally generated record hashes, a group hash for the database 34 is generated at step 128. Thus, the group hash is representative of the data records of the database 34 and is referred to herein as the locally generated group hash. After generation of the locally generated group hash, the hash information of the group hash received from the portable electronic device 22 is compared with the hash information of the corresponding locally generated group hash at step 130. If the comparison of the hash information indicates that the first database 40 of the portable electronic device 22 is not in mismatch with the respective first database 34 of the communication system 20, then a message is sent to the portable electronic device 22 to terminate the synchronization session for the database 40 at step 132.

The message is received at the portable electronic device 22 at step 134 and the synchronization session is terminated for the database 40.

If, on the other hand, the comparison of the hash information indicates that the first database 40 of the portable electronic device 22 is in mismatch with the respective first database 34 of the communication system 20, then one or both of the databases 34, 40 are to be updated and a request for additional hash information is generated by the synchronization server 30 at step 136. The request for additional hash information is a request for hash information associated with data records. The additional hash information is requested for each data record of the first database 40 of the portable electronic device 22. After generation of the request for additional hash information, the request is then transmitted at step 138 to the portable electronic device 22.

Once the request for additional hash information is received at the portable electronic device 22 at step 140, each record hash generated at step 120 is transmitted at step 142 to the communication system 20 over the radio communication channel.

The record hashes are received at the communication system 20 and delivered to the synchronization server 30 at step 144. In response to receipt of the requested additional hash information, each record hash received from the portable electronic device 22 is compared with the corresponding additional locally generated hash (generated at step 128) at step 146 and a determination is made as to whether any of the data records of either or both the first database 34 or the first database 40 of the portable electronic device 22, has changed. For data records that are determined to match, no updating is necessary. For data records determined to be in mismatch, however, the comparison at step 146 also determines where the change is made (i.e. at the communication system 20 side or at the portable electronic device 22 side). Thus, data records in which changes have been made at one of the portable electronic device 22 and the communication system 20 that are not reflected in the corresponding data records at the other of the portable electronic device 22 and the communication system 20 are determined by the comparison at step 146. If it is determined at step 146 that the data has changed, the databases are synchronized by updating the data records of the first database 34 at communication system 20 or the first database 40 at the portable electronic device 22 or the first databases 34, 40 at both the communication system 20 and the portable electronic device 22 that are determined to be mismatched at step 148. With the determination of a mismatch, a conflict resolution policy is run, thereby determining how the mismatched data records are to be updated (i.e. whether to update the database records on the portable electronic device 22 with the database records of the synchronization server 30, whether to update the database records of the synchronization server 30 with the database records on the portable electronic device 22, or whether to update both). After updating of the data records, a message is sent to the portable electronic device 22 to terminate the synchronization session for the database 40 at the portable electronic device at step 132.

The final response is received at the portable electronic device 22 at step 134 and the synchronization session is terminated for the database 40 at the portable electronic device.

Figure 6A:
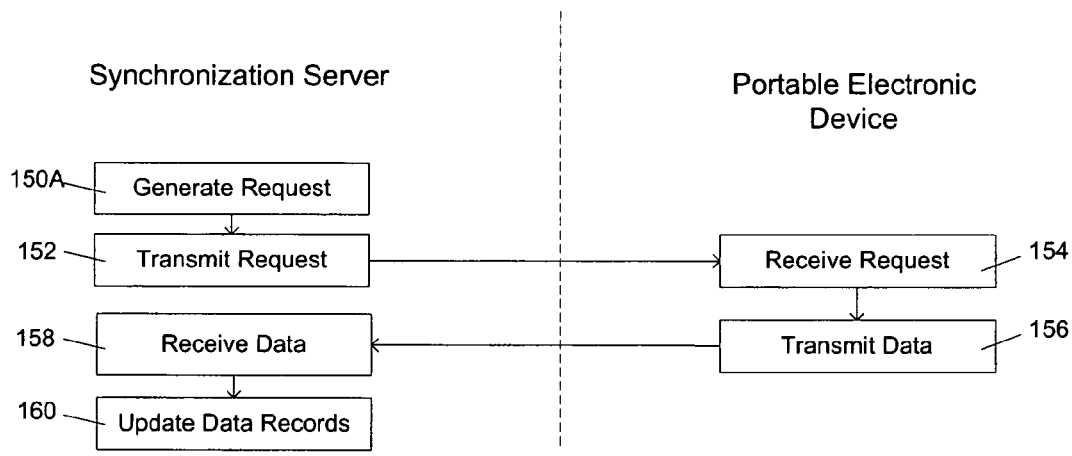
FIG. 6A is a sequence diagram illustrating further functions carried out at both the portable electronic device and the communication system of FIG. 1 during synchronization of databases.

Referring now to FIG. 6A, there is shown a sequence diagram illustrating functions carried out at both the portable electronic device 22 and the communication system 20 during updating of the database 34 of the communication system 20. The steps shown are substeps for updating the data records referred to above with reference to step 148 in FIG. 5A. Again, coding of software for carrying out such steps is well within the scope of a person of ordinary skill in the art. If it is determined at step 146 that additional data records or changes to data records in the database 40 at the portable electronic device 20 are not yet reflected in the database 34 at the communication system 20, a fetch request is generated by the synchronization server 30 as shown at step 150A. After generation of the fetch request, the fetch request is transmitted to the portable electronic device 22 at step 152, thereby requesting data records added or changed on the portable electronic device 22 that have not been updated on the synchronization server 30.

The fetch request is then received at the portable electronic device 22 at step 154 and in response, the requested data records are transmitted to the communication system 20 at step 156.

The requested data records are then received at the communication system 20 and delivered to the synchronization server 30 at step 158. In response to receipt of the requested data records, the database 34 of the communication system 20 is updated at step 160 by writing new data records or overwriting to update previously saved data records in the database 34.

Figure 6B:
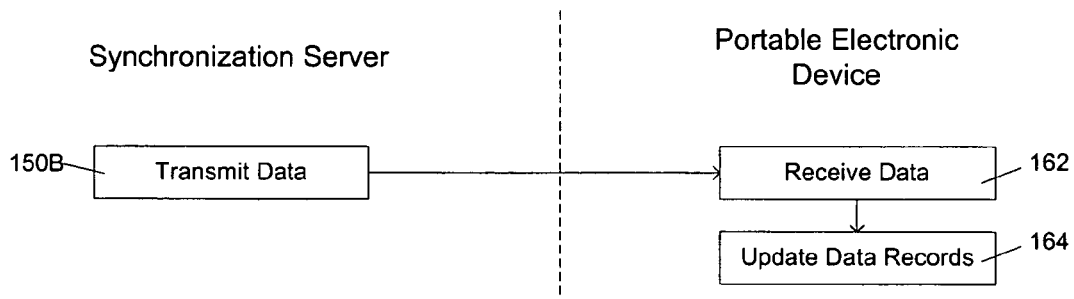
FIG. 6B is a sequence diagram illustrating further functions carried out at both the portable electronic device and the communication system of FIG. 1 during synchronization of databases.

Referring now to FIG. 6B, there is shown a sequence diagram illustrating functions carried out at both the portable electronic device 22 and the communication system 20 during updating of the database 40 at the portable electronic device 22. The steps shown in FIG. 6B are further substeps for updating the data records referred to above with reference to step 148 in FIG. 5A. Yet again, coding of software for carrying out such steps is well within the scope of a person of ordinary skill in the art.

If it is determined at step 146 that additional data records or changes to data records in the database 34 at the communication system 20 are not reflected in the database 40 at the portable electronic device 20, the data records that have been added or changed in the database 34 on the synchronization server 30 that have not been updated on the portable electronic device 22 are transmitted to the portable electronic device 22 at step 150B.

The portable electronic device 22 receives the data records at step 162 and updates the data records at step 164 by writing the new data record or overwriting to update the previously saved data record in the database 40.

Upon completing synchronization of database 34 with database 40, the synchronization server 30 returns to step 108 where decision logic is used to determine the next database for synchronization. In the present example, database 40 has been synchronized. Since databases 41 and 44 depend only from database 40, databases 41 and 44 are ready for synchronizing (step 108A of FIG. 5B). The database 41, however, clearly indicates a lower weighting (6) than the database 44 (10). Thus, the database 41 is smaller than the database 44 and the database 41 is updated next (step 108B of FIG. 5B). A request is generated by the synchronization server 30 for the group hash of the database 41 at step 112. The request for the group hash of the database 41 is then transmitted to the portable electronic device 22 at step 114.

It will be appreciated that the remainder of the steps described above with reference to FIGS. 5A, 5B, 6A and 6B are carried out again to synchronize the database 41 of the portable electronic device 22 with the database 35 of the communication system 20. These steps are described above and are therefore not described again herein.

Upon completing synchronization of database 41 with database 35, the synchronization server 30 again returns to step 108 where decision logic is used to determine the next database for synchronization. The database 43 at the portable electronic device 20 is then synchronized with the database 37 at the communication system 20. It will be understood that synchronization of databases is repeated to synchronize the database 42 at the portable electronic device 22 with the database 36 at the communication system 20 and to synchronize the database 44 at the portable electronic device 22 with the database 38 at the communication system 20. After completing synchronization of all the databases, the synchronization server returns to step 108 where it is determined that each of the databases of the directed acyclic graph are synchronized and the process ends at step 110.

Figure 7A:
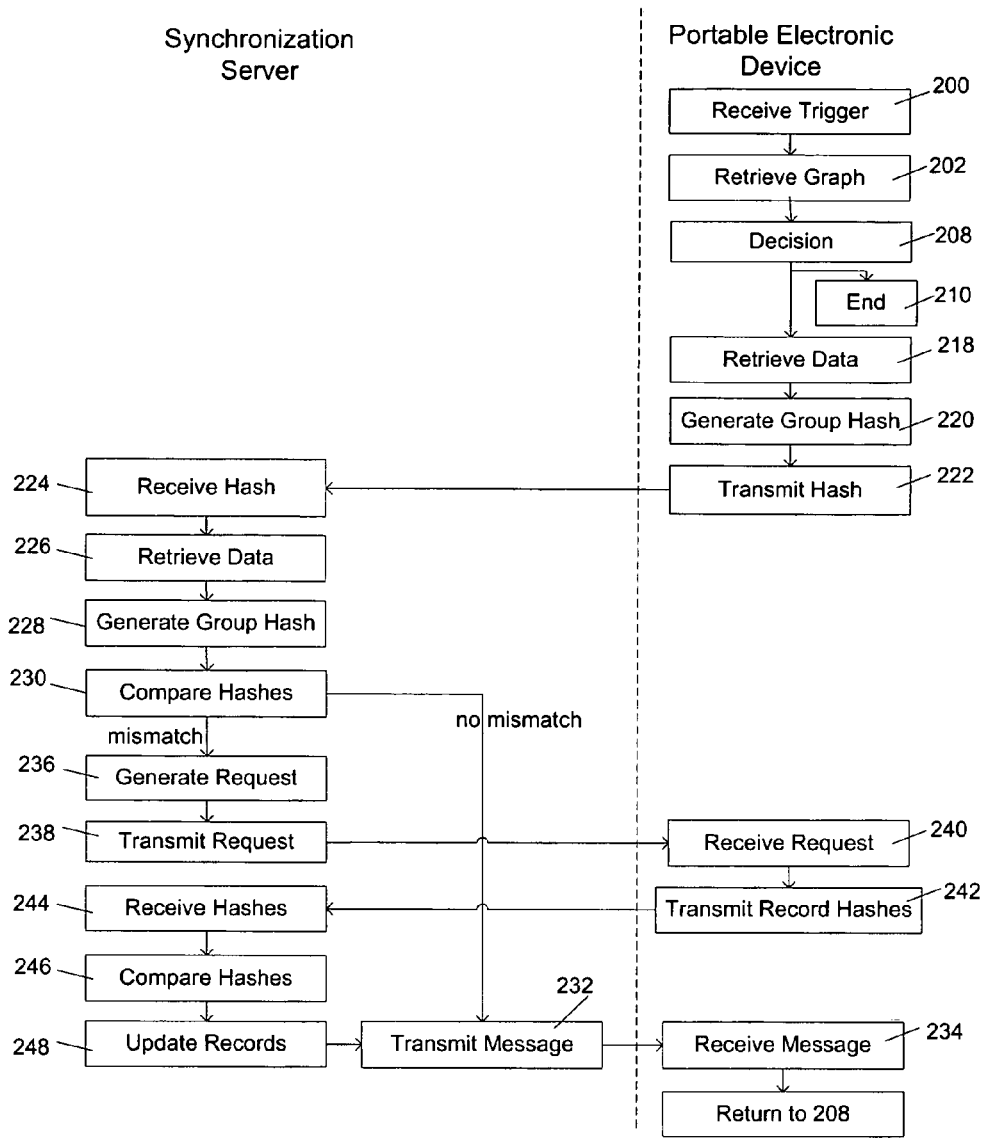
FIGS. 7A and 7B are sequence diagrams illustrating functions carried out at both the portable electronic device and the communication system of FIG. 1 during synchronization of databases, according to another embodiment.

Reference is now made to FIG. 7A, which shows a sequence diagram illustrating functions carried out at both the portable electronic device 22 and the communication system 20 during synchronization of databases connected by wireless interface, in accordance with another embodiment of the present application. Many of the steps of the present embodiment are similar to those described above and therefore are not described again in detail. Again, coding of software for carrying out such steps is well within the scope of a person of ordinary skill in the art. First, the portable electronic device 22 receives a synchronization trigger at 200 and in response, the directed acyclic graph 70 is retrieved from the persistent storage device 52 at step 202. In the present embodiment, the directed acyclic graph 70 is not transmitted to the synchronization server 30. Instead, the portable electronic device 22 analyzes the directed acyclic graph 70 and initializes the databases 40, 41, 42, 43, 44 in the correct order. The portable electronic device 22 analyzes the directed acyclic graph 70 and makes the decision of what, if any, database to synchronize next at step 208.

Figure 7B:
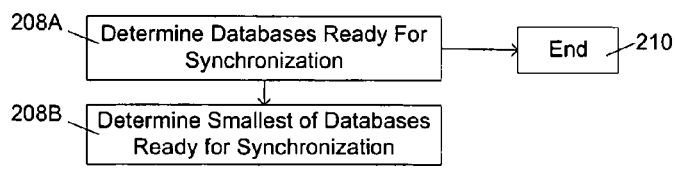

Referring to FIG. 7B, the decision of what, if any, database to synchronize is first based on the database dependencies and which databases have already be synchronized and then based on the size of the database. At step 208A, the processor 46 of the portable electronic device 22 determines which of the databases represented by the directed acyclic graph, are ready to be synchronized. When all databases (if any) from which a particular database depends, have been synchronized, that particular database is ready for synchronizing. Conversely, when any database from which a particular database depends, has not been synchronized, that particular database is not ready for synchronizing. After determining which databases represented by the directed acyclic graph are ready to synchronized, the processor 46 determines which of these databases is to be synchronized first based on the size of the database. The smallest database is synchronized first in order to synchronize the highest number of databases in the shortest period of time. Referring again to FIG. 4 for exemplary purposes, none of the databases has been synchronized yet. Thus, the only database for which all databases from which it depends (if any), have been synchronized, is the database 40. Thus, the synchronization server determines that the database 40 is to be synchronized.

Referring again to FIG. 7A, data is retrieved from the database 40 at step 218. The processor 46 first generates a record hash for each data record of the database 40 and then generates a group hash for the database 40, based on the individual record hashes at step 220. The group hash is transmitted to the communication system 20 along with an initialize command, over a radio communication channel at step 222. The initialize command initiates the synchronization process at the synchronization server 30, identifies the databases for synchronization and provides synchronization session state information including a session state identifier. The portable electronic device 22 then awaits a response from the communication system 20.

The communication system 20 receives the initialize command along with the group hashes at step 224 by receipt at the base station 24. The base station 24 forwards the initialize command and the group hashes to the synchronization server 30. In response to receipt of the initialize command, the synchronization server 30 retrieves all data records for the database 34 on the communication system 20 side at step 226. The synchronization server 30 first generates a record hash for each data record of the database 34. The record hashes are referred to herein as the locally generated record hashes. From the locally generated record hashes, a group hash for the database 34 is generated at step 228. After generation of the locally generated group hash, the hash information of the group hash received from the portable electronic device 22 is compared with the hash information of the corresponding locally generated group hash at step 230. If the comparison of the hash information indicates that the first database 40 of the portable electronic device 22 is not in mismatch with the respective first database 34 of the communication system 20, then a message is sent to the portable electronic device 22 to terminate the synchronization session for the database 40 at step 232.

The message is received at the portable electronic device 22 at step 234 and the synchronization session is terminated for the database 40.

If, on the other hand, the comparison of the hash information indicates that the first database 40 of the portable electronic device 22 is in mismatch with the respective first database 34 of the communication system 20, then one or both of the databases 34, 40 are to be updated and a request for additional hash information is generated by the synchronization server 30 at step 236. After generation of the request for additional hash information, the request is then transmitted at step 238 to the portable electronic device 22.

Once the request for additional hash information is received at the portable electronic device 22 at step 240, each record hash generated at step 220 is transmitted at step 242 to the communication system 20 over the radio communication channel.

The record hashes are received at the communication system 20 and delivered to the synchronization server 30 at step 244 and each record hash received from the portable electronic device 22 is compared with the corresponding additional locally generated record hash (generated at step 228) at step 246 and a determination is made as to whether any of the data records of either or both the first database 34 or the first database 40 of the portable electronic device 22, has changed. For data records that are determined to match, no updating is necessary. For data records determined to be in mismatch, however, the comparison at step 246 also determines where the change is made (i.e. at the communication system 20 side or at the portable electronic device 22 side). If it is determined at step 246 that the data has changed, the databases are synchronized by updating the data records of the first database 34 at communication system 20 or the first database 40 at the portable electronic device 22 or the first databases 34, 40 at both the communication system 20 and the portable electronic device 22 that are determined to be mismatched at step 248. After updating of the data records, a message is sent to the portable electronic device 22 to terminate the synchronization session for the database 40 at the portable electronic device at step 232.

The final response is received at the portable electronic device 22 at step 234 and the synchronization session is terminated for the database 40 at the portable electronic device.

Upon completing synchronization of database 34 with database 40, the portable electronic device 22 returns to step 208 where decision logic is used to determine the next database for synchronization. In the present example, database 40 has been synchronized. Since databases 41 and 44 depend only from database 40, databases 41 and 44 are ready for synchronizing (step 208A of FIG. 7B). The database 41, however, clearly indicates a lower weighting (6) than the database 44 (10). Thus, the database 41 is smaller than the database 44 and the database 41 is synchronized next (step 208B of FIG. 7B).

It will be appreciated that the remainder of the steps described above with reference to FIG. 7A are carried out again to synchronize the database 41 of the portable electronic device 22 with the database 35 of the communication system 20. These steps are described above and are therefore not described again herein.

Upon completing synchronization of database 41 with database 35, the portable electronic device 22 again returns to step 208 where decision logic is used to determine the next database for synchronization. The database 43 at the portable electronic device 20 is then synchronized with the database 37 at the communication system 20. It will be understood that synchronization of databases is repeated to synchronize the database 42 at the portable electronic device 22 with the database 36 at the communication system 20 and to synchronize the database 44 at the portable electronic device 22 with the database 38 at the communication system 20. After completing synchronization of all the databases, the portable electronic device returns to step 208 where it is determined that each of the databases of the directed acyclic graph 70 are synchronized and the process ends at step 210.

Figure 8:
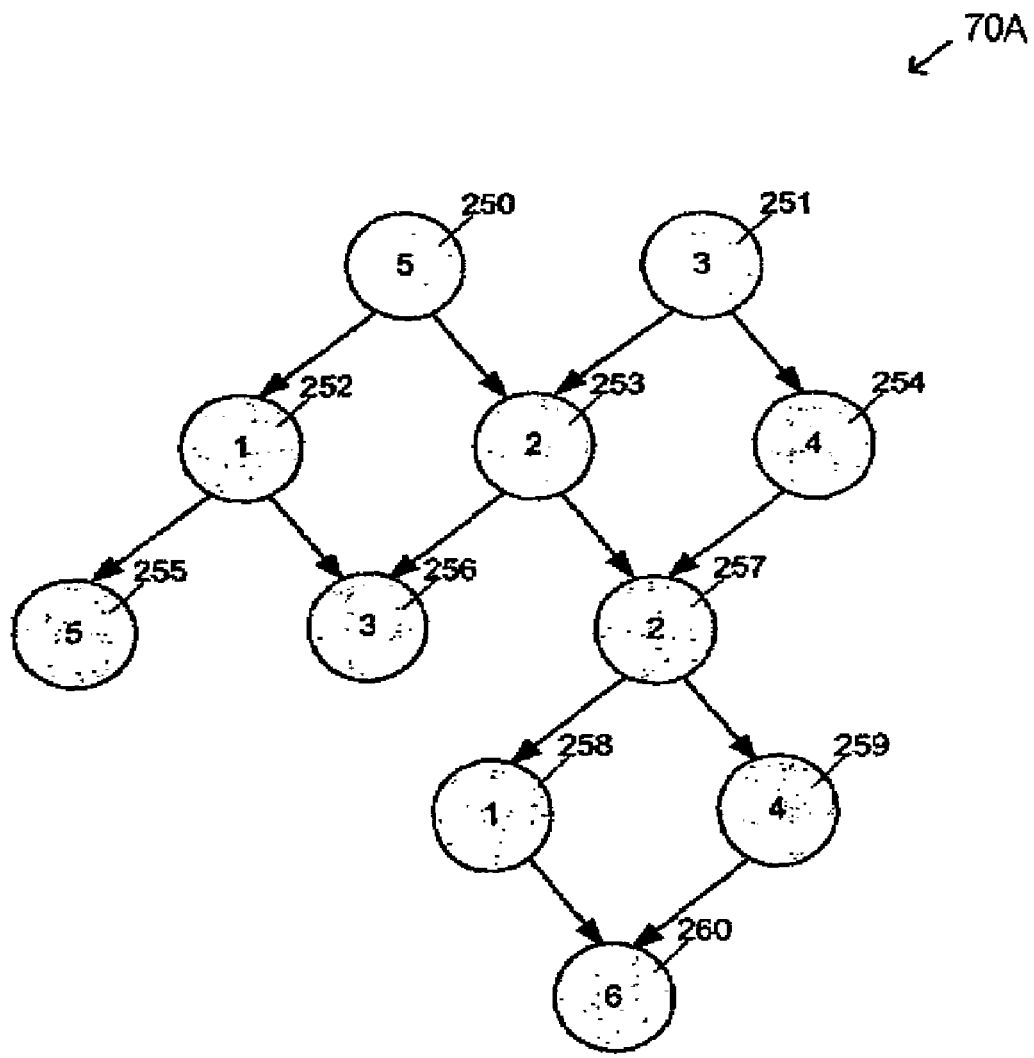
FIG. 8 is another exemplary directed acyclic graph representing databases and relationships according to an embodiment.

Reference is now made to FIG. 8, which shows another exemplary directed acyclic graph 70A. In the present example, the directed acyclic graph 70A includes 11 nodes representing respective databases 250 to 260. It will be understood that databases 250 to 260 are databases of the portable electronic device 22 in the present example. Each node of the graph is associated with the respective database that the node represents by, for example, the name of the database or some unique identifier. As in the first described example (in FIG. 4), the nodes are connected by edges representing dependency relationships between the databases 250 to 260. In the present directed acyclic graph 70 of FIG. 8, the databases 250, 251 do not depend from any other database as the nodes representing the databases 250, 251 are shown as source nodes (without incoming edges). The remaining databases 252 to 260, on the other hand, depend from at least one other database. Again, each database includes an associated numerical weighting which, in the present example, represents the size of the database. In the exemplary directed acyclic graph, the associated numerical weighting is shown in the nodes representing the databases. It will be appreciated that these numerical weightings can be included in the graph or associated with the databases in any other suitable manner. For example, the numerical weightings can be associated with the respective databases in, for example, a lookup table.

The present exemplary directed acyclic graph is again used in the determining what, if any, database is to be synchronized based on database dependencies and based on which databases have already been synchronized, in the method described in reference to FIGS. 5A and 5B or in the method described in reference to FIGS. 7A and 7B. Referring for example to FIG. 7B, at step 208A, the processor 46 of the portable electronic device 22 determines which of the databases represented by the directed acyclic graph, are ready to be synchronized. When all databases (if any) from which a particular database depends, have been synchronized, that particular database is ready for synchronizing. Conversely, when any databases from which a particular database depends, has not been synchronized, that particular database is not ready for synchronizing. After determining which databases represented by the directed acyclic graph are ready to synchronized, the processor 46 determines which of these databases is to be synchronized first based on the size of the database. The smallest database is synchronized first in order to synchronize the highest number of databases in the shortest period of time. Referring again to FIG. 8 for exemplary purposes, none of the databases has been synchronized yet. Thus, the only databases for which all databases from which they depend (if any), have been synchronized, are the databases 250 and 251. In the present case, the database 251 is smaller than database 250. Thus, the synchronization server determines that the database 251 is to be synchronized first at step 208B. The remainder of the steps of synchronization are described hereinabove and therefore are not described again.

Upon completing synchronization of the database 251 with a corresponding database connected to the server 30 through the connector 33, the portable electronic device 22 returns to step 208 where decision logic is used to determine the next database for synchronization. In the present example, database 251 has been synchronized. Since database 250 does not depend from any other database and database 254 depends only from database 251, databases 250 and 254 are ready for synchronizing (step 108A of FIG. 7B). The database 254, however, clearly indicates a lower weighting (4) than the database 250 (5). Thus, the database 254 is smaller than the database 250 and the database 254 is synchronized next (step 108B of FIG. 7B).

It will be appreciated that the remainder of the steps described above with reference to FIG. 7A are carried out again to synchronize the database 250 of the portable electronic device 22 with the database 35 of the communication system 20. These steps are described above and are therefore not described again herein.

Upon completing synchronization of database 250 with the corresponding database connected to the server 30, the portable electronic device 22 again returns to step 208 where decision logic is used to determine the next database for synchronization. The remainder of the databases are synchronized by the synchronizing database 250, followed by the database 252, followed by the database 253, followed by the database 257, followed by the database 258, followed by the database 256, followed by the database 259, followed by the databases 255 and 260.

In the above-described embodiments, all of the databases are synchronized. It will be understood that it is not required that all databases be synchronized. For example, the addition of a database may not require that all other databases be synchronized. Many databases may already be synchronized.

According to one aspect of an embodiment, a method is provided for synchronizing databases at a portable electronic device with corresponding databases at a second electronic device, the method including determining which one of the databases at the portable electronic device is to be synchronized based on a directed acyclic graph representing database dependencies, and synchronizing the one of the databases at the portable electronic device with a corresponding one of the databases at the second electronic device.

According to another aspect of an embodiment, an electronic device is provided that includes at least one memory for storing a plurality of databases and a directed acyclic graph representing database dependencies, and a processor for determining which one of the databases is to be synchronized based on the directed acyclic graph and for initiating synchronization of the one of the databases with a corresponding database at a second electronic device.

Advantageously, a directed acyclic graph is used to define the dependency relationships between the databases. The vertices of the directed acyclic graph represent databases and the edges define the dependency relationships. Thus, the addition or modification of one dependency relationship of a database does not affect other existing relationships. According to another particular embodiment, the directed acyclic graph is weighted by assigning to each node a value that represents the time involved in synchronizing the database represented by that node. Thus, the databases can be synchronized in an order to restore the highest number of databases in the least amount of time, while respecting the dependency relationships.

While the embodiments described herein are directed to particular implementations of the method and apparatus for synchronizing databases connected by wireless interface, it will be understood that modifications and variations to this embodiment are within the sphere and scope of the present application. For example, it will be appreciated that the order of the databases synchronized can be determined based only on the database dependencies. Thus, for two databases that are ready for synchronization, those databases are synchronized in any order. It will also be understood that the portable electronic device 22 is not limited to five databases as any suitable number of databases is possible, as shown in FIG. 8 which includes 11 databases. Similarly, the communication system 20 may include any suitable number of databases. Rather than the nodes of the directed acyclic graph being weighted, the edges can be weighted. In this case, if there is more than one source node, an additional node can be added from which the source nodes depend. The additional node does not represent a database but instead only provides a starting point for synchronization. It will also be understood that the steps described hereinabove are not limited to the order in which they are described. The steps described can be performed in any suitable order as may occur to those skilled in the art.

Many other modifications and variations may occur to those skilled in the art. All such modifications and variations are believed to be within the sphere and scope of the present application.

The invention claimed is:

1. A method for synchronizing databases at a portable electronic device with corresponding databases at a second electronic device, the method comprising:
   determining which one of said databases at said portable electronic device is to be synchronized based on a directed acyclic graph representing database dependencies; and synchronizing said one of said databases at said portable electronic device with a corresponding one of said databases at said second electronic device;

determining a next one of said databases at said portable electronic device to be synchronized based on said directed acyclic graph;

synchronizing said next one of said databases at said portable electronic device with a corresponding next one of said databases at said second electronic device; and repeating determining said next one of said databases and synchronizing said next one of said databases until all said databases at said portable electronic device are synchronized with said corresponding databases at said second electronic device.

2. The method according to claim 1, wherein determining which one of said databases at said portable electronic device is to be synchronized comprises determining based on database dependencies and based on weighting factors associated with said databases at said portable electronic device.

3. The method according to claim 1, wherein said databases are represented as nodes of said directed acyclic graph and database dependencies are represented by edges of said directed acyclic graph.

4. The method according to claim 3, wherein said databases are weighted in said directed acyclic graph by respective assigned values.

5. The method according to claim 4, wherein determining which one of said databases at said portable electronic device is to be synchronized comprises determining based first on said database dependencies and second on said assigned values.

6. The method according to claim 4, wherein said values are representative of one of an estimation of time involved in synchronizing respective databases, a size of said respective databases, and a number of data records of said respective databases.

7. An electronic device comprising:

at least one memory for storing a plurality of databases and a directed acyclic graph representing database dependencies;

a processor for determining which one of said databases is to be synchronized based on said directed acyclic graph, initiating synchronization of said one of said databases with a corresponding database at a second electronic device, determining a next one of said databases to be synchronized based on said directed acyclic graph, initiating synchronization of said next one of said databases with a corresponding next database at said second electronic device, and repeating determining said next one of said databases and initiating synchronization of said next one of said databases until all said databases are synchronized with corresponding databases at said second electronic device.

8. The electronic device according to claim 7, wherein said processor determines said one of said databases at said electronic device to be synchronized based on database dependencies and based on weighting factors associated with said databases at said electronic device.

9. The electronic device according to claim 7, wherein said plurality of databases are represented as nodes of said directed acyclic graph and database dependencies are represented by edges of said directed acyclic graph.

10. The electronic device according to claim 9, wherein said databases are weighted in said directed acyclic graph by respective assigned values.

11. The electronic device according to claim 10, wherein determining which one of said databases at said electronic device is to be synchronized comprises determining based first on said database dependencies and second on said assigned values.

12. The electronic device according to claim 10, wherein said values are representative of one of an estimation of time involved in synchronizing respective ones of said databases, a size of said respective ones of said databases, and a number of data records of said respective ones of said database.

* * * * *